(12) United States Patent
Wenger et al.

(10) Patent No.: US 8,844,665 B2
(45) Date of Patent: Sep. 30, 2014

(54) SKID STEERED ALL TERRAIN VEHICLE

(75) Inventors: Urs Wenger, Rumisberg (CH); Beat Kohler, Kirchberg (CH); Hans-Rudolf Jenni, Grasswil (CH)

(73) Assignee: Swissauto Powersport LLC, Burgdorf (CH)

( * ) Notice: Subject to any disclaimer, the term of this patent is extended or adjusted under 35 U.S.C. 154(b) by 0 days.

(21) Appl. No.: 11/965,165

(22) Filed: Dec. 27, 2007

(65) Prior Publication Data

US 2009/0166101 A1 Jul. 2, 2009

(51) Int. Cl.
*B62M 27/02* (2006.01)
*B62D 5/07* (2006.01)
*B62D 11/18* (2006.01)
*B62D 5/06* (2006.01)
*B62D 5/065* (2006.01)
*B62D 11/00* (2006.01)

(52) U.S. Cl.
CPC .............. *B62D 11/183* (2013.01); *B62D 5/075* (2013.01); *B62D 5/063* (2013.01); *B62D 5/065* (2013.01); *B62D 11/001* (2013.01)
USPC ......................................... 180/193; 180/9.1

(58) Field of Classification Search
USPC ............................... 180/6.44, 6.62
See application file for complete search history.

(56) References Cited

U.S. PATENT DOCUMENTS

| | | | | |
|---|---|---|---|---|
| 1,356,718 A | * | 10/1920 | Holt | 475/21 |
| 2,336,911 A | * | 12/1943 | Zimmermann | 475/23 |
| 2,336,912 A | * | 12/1943 | Zimmermann | 475/23 |
| 3,295,620 A | * | 1/1967 | Messenger | 180/6.7 |
| 3,371,734 A | * | 3/1968 | Zaunberger et al. | 180/6.44 |
| 3,385,255 A | * | 5/1968 | Raymond et al. | 440/12.56 |
| 3,450,218 A | * | 6/1969 | Looker | 180/6.44 |
| 3,565,198 A | * | 2/1971 | Victor | 180/9.44 |
| 3,581,600 A | * | 6/1971 | Holdeman | 74/665 R |
| 4,037,620 A | * | 7/1977 | Johnson | 137/596 |
| 4,043,419 A | * | 8/1977 | Larson et al. | 180/402 |
| 4,174,762 A | * | 11/1979 | Hopkins et al. | 180/6.44 |
| 4,434,680 A | | 3/1984 | Riediger et al. | |
| 4,718,508 A | * | 1/1988 | Tervola | 180/6.44 |

(Continued)

FOREIGN PATENT DOCUMENTS

DE 10059563 3/2002
EP 1431162 6/2004

(Continued)

OTHER PUBLICATIONS

Argo Avenger 8×8 vehicle specifications: circa Dec. 6, 2006, 2 pages http://web.archive.org/web/20061023014702/argoatv.com/products/product_specs.asp?MID=15.*

(Continued)

*Primary Examiner* — Joseph M Rocca
*Assistant Examiner* — Jacob Knutson
(74) *Attorney, Agent, or Firm* — Faegre Baker Daniels LLP

(57) ABSTRACT

A skid steered light all terrain vehicle (LATV), including two driving units for the wheels or tracks on both sides of the vehicle and a differential steering device with a differential gear. The differential steering device is designed to produce a defined differential speed of the two drive units of the vehicle related to the steering angle of the steering device regardless to the surface condition where the vehicle is driving. The LATV also includes an additional steering drive acting on the differential gear.

12 Claims, 4 Drawing Sheets

(56) References Cited

U.S. PATENT DOCUMENTS

| | | | |
|---|---|---|---|
| 4,810,043 A * | 3/1989 | McIntosh | 305/15 |
| 4,917,200 A * | 4/1990 | Lucius | 180/6.2 |
| 5,004,060 A * | 4/1991 | Barbagli et al. | 180/6.44 |
| 5,113,821 A * | 5/1992 | Fukui et al. | 123/333 |
| 5,135,427 A * | 8/1992 | Suto et al. | 446/433 |
| 5,803,043 A * | 9/1998 | Bayron et al. | 123/335 |
| 6,135,220 A | 10/2000 | Gleasman et al. | |
| 6,152,106 A * | 11/2000 | Reese et al. | 123/339.16 |
| 6,170,597 B1 * | 1/2001 | Fukuda | 180/292 |
| 6,193,622 B1 * | 2/2001 | Cressman et al. | 474/109 |
| 6,298,931 B1 * | 10/2001 | Easton | 180/6.44 |
| 6,325,736 B1 * | 12/2001 | Hamada et al. | 475/18 |
| 6,491,118 B1 * | 12/2002 | Hou et al. | 180/6.44 |
| 6,564,774 B2 * | 5/2003 | Ellims et al. | 123/352 |
| 6,782,960 B2 * | 8/2004 | Kanzler et al. | 180/9.44 |
| 6,953,408 B2 * | 10/2005 | Thompson | 475/5 |
| 7,059,433 B2 * | 6/2006 | Hasegawa et al. | 180/6.2 |
| 7,131,507 B2 | 11/2006 | Wenger et al. | |
| 2002/0038731 A1 * | 4/2002 | Trefz et al. | 180/53.4 |
| 2002/0096374 A1 * | 7/2002 | Ryan | 180/6.7 |
| 2002/0152987 A1 * | 10/2002 | Woolford et al. | 123/333 |
| 2002/0193927 A1 * | 12/2002 | Nakagawa et al. | 701/50 |
| 2004/0250643 A1 * | 12/2004 | Jones | 74/473.21 |
| 2004/0251069 A1 * | 12/2004 | Austin | 180/233 |
| 2005/0183416 A1 | 8/2005 | Hayashi et al. | 60/445 |
| 2006/0157290 A1 | 7/2006 | Wenger et al. | |
| 2007/0068710 A1 * | 3/2007 | Witzenberger et al. | 180/6.44 |
| 2007/0198158 A1 * | 8/2007 | Ishibashi et al. | 701/50 |
| 2007/0296170 A1 * | 12/2007 | Field et al. | 280/47.131 |

FOREIGN PATENT DOCUMENTS

| | | |
|---|---|---|
| EP | 1561672 | 8/2005 |
| EP | 1757513 | 2/2007 |
| JP | 1991-000574 A | 5/1989 |
| RU | 2240246 | 11/2004 |
| WO | WO 97/02975 | 1/1997 |
| WO | WO 2005092691 A1 * | 10/2005 ............ B62D 11/04 |

OTHER PUBLICATIONS

Multiple Argo 6×6 and 8×8 vehicle specifications: circa Dec. 2, 2000, 1 page http://web.archive.org/web/20001014041227/www.argoatv.com/specifications.html.*

International Search Report dated Sep. 22, 2009, issued in corresponding International Application No. PCT/CH2008/000529.

* cited by examiner

SKID STEERED ALL TERRAIN VEHICLE

TECHNICAL FIELD

The present invention pertains to a skid steered All Terrain Vehicle (ATV), comprising a steering device, whereby the ATV has skid steered wheels or endless tracks, and the steering device comprises a differential gearbox.

BACKGROUND OF THE INVENTION

ATVs exist in different layouts and with different drive and steering systems. There are mainly two categories as to how steering can be effectuated on such vehicles.

In the first and most common category of such vehicles, the vehicles are steered by at least two wheels, which are pivoting horizontally around a vertical pivot point. These wheels are connected mechanically, by rods or gears to a steering wheel or a handlebar. The driver turns the handlebar or steering wheel to turn the wheels and to steer the vehicle. The steering can be assisted hydraulically or electrically to reduce the steering forces for the rider.

In the second category of such ATVs, the vehicles are skid steered and have no horizontal pivoting wheels. All wheels are solid mounted regarding the driving direction of the vehicle and are rigidly connected to a suspension system or directly to the vehicle body. This applies for wheel driven vehicles either with 4, 6, or 8 wheels as in FIG. 2, or for vehicles with endless tracks instead of wheels. The present invention pertains to this second category.

Such skid steered ATVs are known from different manufacturers in different vehicle classes, beginning with very heavy battle tanks and ending with light vehicles with a weight of about 1 ton at maximum, and including commercial snow handling vehicles and vehicles used in construction and the like.

The present invention pertains to a sector out of all possible skid steered vehicles, such as a full track ATV, as disclosed in the U.S. Pat. No. 7,131,507 B2 with the same inventors as this application, or light weight small vehicles with four, six or eight wheels, which are present on the market. The dryweight of those vehicles is under about one ton.

One of the drawbacks of the known ATVs of the prior art, and also of the low weight ATVs, hereinafter LATV, concerns the steering. In particular, smooth control and full security is required at higher vehicle speeds and, especially, at variable or changing ground conditions.

These light and relatively small LATV are usually steered in a way that requires the drive system to be divided into right wheels or track and left wheels or track. When steering is applied, the left or the right wheel group (or track) is disconnected from the drive with some kind of a clutch, and brake force is applied to that same wheel group or track to slow down the speed and to make the vehicle turn because of this resulting speed difference between the wheel groups or tracks of the vehicle.

The drawback of such systems is that the brake which is needed to steer the vehicle destroys the torque on one side of the vehicle, e.g., the inner side of the vehicle when driving a curve, whereas on the other side of the vehicle, i.e., the outer side, more torque and track speed is, needed to keep the vehicle speed constant. This system is inefficient and does not allow operating the vehicle smoothly and safely at higher speeds. It is especially important, if the driving ground condition changes from hard to soft (for example, from tar to snow or mud), when the vehicle is driven around a corner. During such change in driving conditions, these vehicles get out of control because the driver must adapt applied braking forces to compensate for the higher or lower grip and resistance behavior of the tracks or wheels, that is practically not controllable because of a very short reaction time involved.

To obviate the above mentioned drawback, it is known to use a differential steering device. There exist very heavy and very complicated differential steering systems for battle tanks and similar heavy vehicles. However, these cannot be used in light and small vehicles because of their complexity, weight, size and costs, as per the following examples.

U.S. Pat. No. 6,135,220 discloses a track-laying vehicle and is directed to a modular system for supporting the drive mechanism. This system comprises two drive units including a differential and a steering assembly using an additional differential.

U.S. Pat. No. 4,434,680 discloses a steering differential for earthmoving tractors, but this steering differential is not applicable for fast moving LATVs and is too complex for light and low cost vehicles.

WO 97/02975 discloses a differential driving system with two differentials and a steering differential.

SUMMARY OF THE INVENTION

In the light of the above mentioned prior art, an object of the present invention is to provide for an effective but yet simple and easy to produce differential steering device for skid steered LATVs, which are enabled to drive and steer in a controlled manner at higher vehicle speeds with high safety and smoothness even if the ground surface condition changes dramatically while driving fast around a corner.

This object is attained with a differential steering device, wherein the ATV is a light ATV (LATV) and wherein the differential steering device is designed to produce a defined differential speed of the two drive units of the vehicle. The defined differential speed is related to a steering angle of a steering input to the differential steering device regardless of the surface condition on which the vehicle is driven. Further, an additional steering drive acts on the differential gear.

BRIEF DESCRIPTION OF THE DRAWINGS

Further characteristics and advantages will become clear from the detailed description, which follows with reference to the drawings.

DETAILED DESCRIPTION OF THE INVENTION

Figure 1:
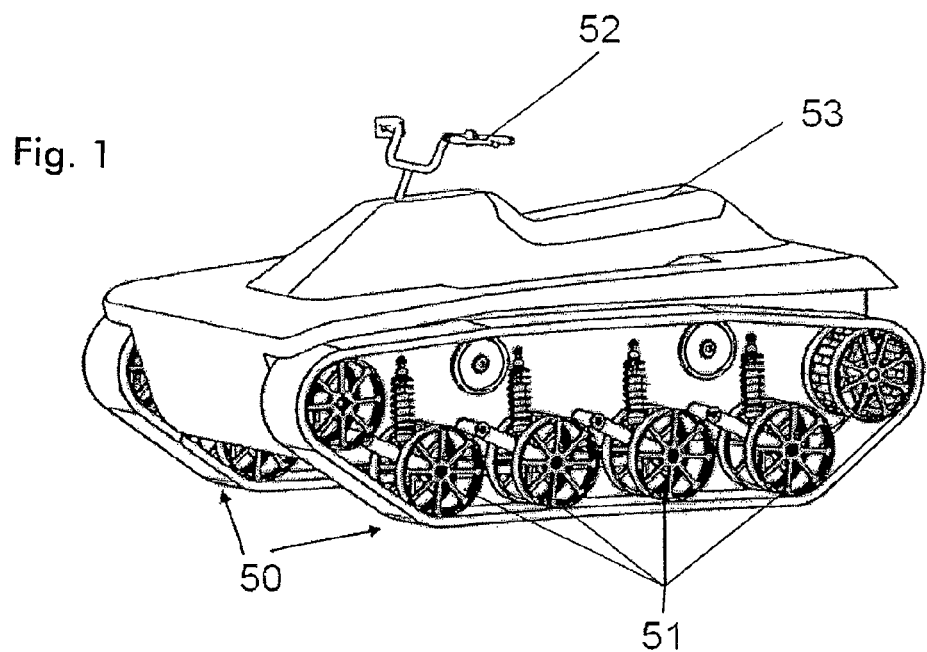
FIG. 1 shows a simplified perspective view of a full track LATV according to the prior art.

As will be explained in detail below, the new differential steering system principle can be used on either wheel or track driven skid steer vehicles. It allows to control the vehicle safely even at high speeds, up to and over 60 mph, and keeps the vehicle on track even if the driving surface changes dramatically from tar to snow or mud during steering of the vehicle around a corner.

Essentially, in the new system the driving power is produced with a combustion engine, which is connected over a gearbox with a shaft or directly to a differential steering gear case. The exact configuration and design of the drive and steering unit is not relevant. It could be, for example, executed as an electrical, hydraulic, or mechanical unit or as a combination thereof.

If the vehicle is driving straight forward, the power is applied to both right and left wheel groups or tracks through the right and left vehicle drive units. Both drive units turn exactly at the same speed, regardless of the needed torque of each side but depending on driving surface conditions. For example, the vehicle can be driven on snow or mud, i.e., soft and slippery surface, on the one side, and on concrete or tar, i.e., hard surface, on the other side.

If the vehicle steers to one side, the steering system located in the steering gear case applies a differential speed to the driving speed of each drive unit, as initiated by a hydraulic system and the differential gears. The speed of the right and the left drive unit then becomes different and dependent on a desired corner radius around which the vehicle is driven.

The differential speed of the two driving units is achieved by a controlled variation of the drive ratio between the two driving units, and not by applying any steering brakes. Therefore the driving power is not diminished. The total torque applied to the drive systems does not change during steering, only the distribution of the torque changes. The reduction in torque on one side is applied/added to the other side. Based on this behavior, the vehicle keeps a constant driving speed during steering without any additional power supplied to the drive units to compensate for steer-braking losses.

The electronic throttle control system which will be explained below just compensates for the additional power needed for the hydraulic system to initiate the steering input. This system allows to control the drivability of the vehicle for smooth and easy riding. It is also able to control the vehicle speed limitations for either different driving modes, e.g., a learner mode, or just to achieve safety while driving the vehicle smoothly in reverse with a limited vehicle speed controlled by the electronic throttle instead of any hard engine reverse limiter. The same function can be applied to other gear stages, i.e., to protect the engine from overreacting in short gearing ratios.

The steering input device 40 (see FIG. 5) is effectuated by a handlebar in the preferred embodiment, but can be effectuated by a steering wheel, or even by a servo for remote control of the vehicle. The steering angle of this steering input device 40 defines the differential speed of the two drive units of the vehicle and, therefore, the turning radius of the vehicle depending on the vehicle speed. Thus, the differential speed does not depend on the various grip conditions on the two drive units.

Due to the layout of the steering system, the steering result inversely depends on the vehicle speed. In other words, at low vehicle speeds, the steering input results in a higher differential speed ratio of the drive units and, therefore, in a smaller turning radius of the vehicle.

At higher vehicle speeds the same steering input results in a lower differential speed ratio of the drive units and, therefore, in a wider turning radius. This inverse behavior allows for a high maneuverability of the vehicle at low speeds but gives a smooth and safe reaction at high speeds. Such behavior is also known from the automotive applications where this is also a big concern.

If during steering, the ground surface condition changes, the system balances the torque needed on each side and keeps the same differential speed ratio as the steering input demands. This behavior of the steering system is most advantageous and helps to steer the vehicle safely and precisely even at higher vehicle speeds and on various or changing ground surface conditions.

FIG. 1 shows a simplified perspective view of a full track LATV according to the prior art, where two tracks 50 are supported by idler wheels 51 which are mounted to the suspension arms. A straddle type seat 53 has the capacity for one or two persons, one behind the other, the driver controlling the vehicle with a motorcycle type handlebar 52.

Figure 2:
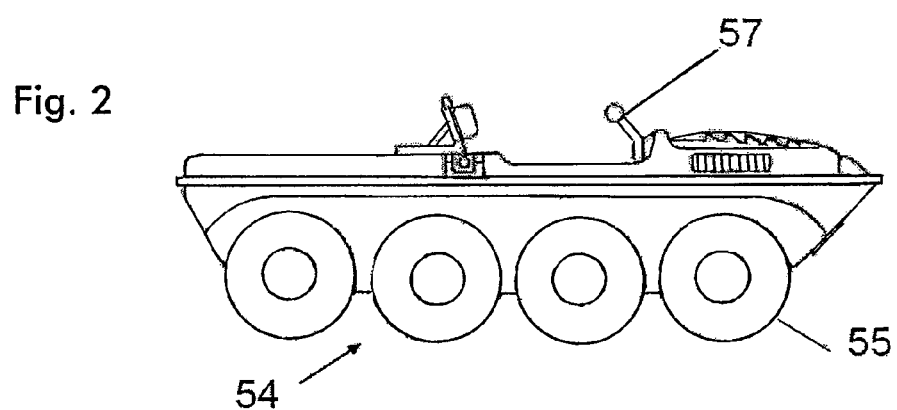
FIG. 2 shows a simplified lateral view of a wheeled LATV according to the prior art.
Figure 2A:
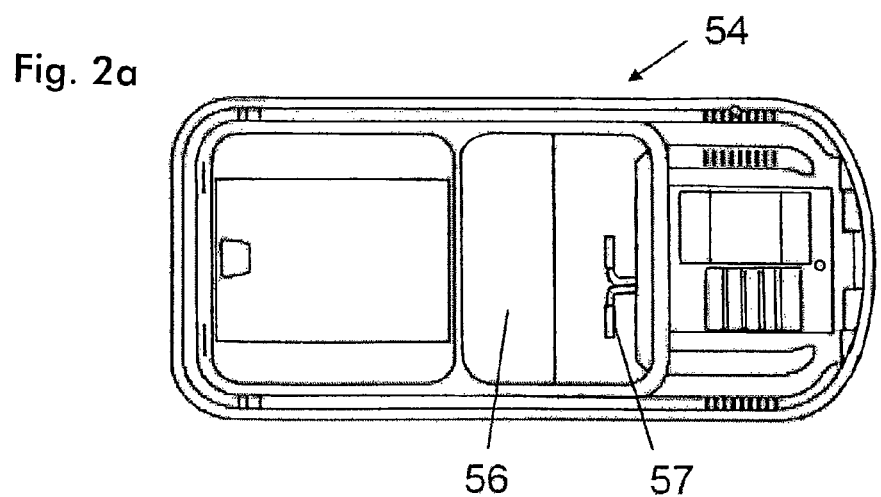
FIG. 2A shows the LATV of FIG. 2 in a plan view.

FIG. 2 shows a simplified perspective view of a wheeled LATV according to the prior art, where wheels 55 are mounted usually directly at a carosserie 54. Seat 56 also offers a place for two persons but side by side, the driver controlling the vehicle through steering levers 57 by pulling one lever back for turning the vehicle to the corresponding side.

Figure 3:
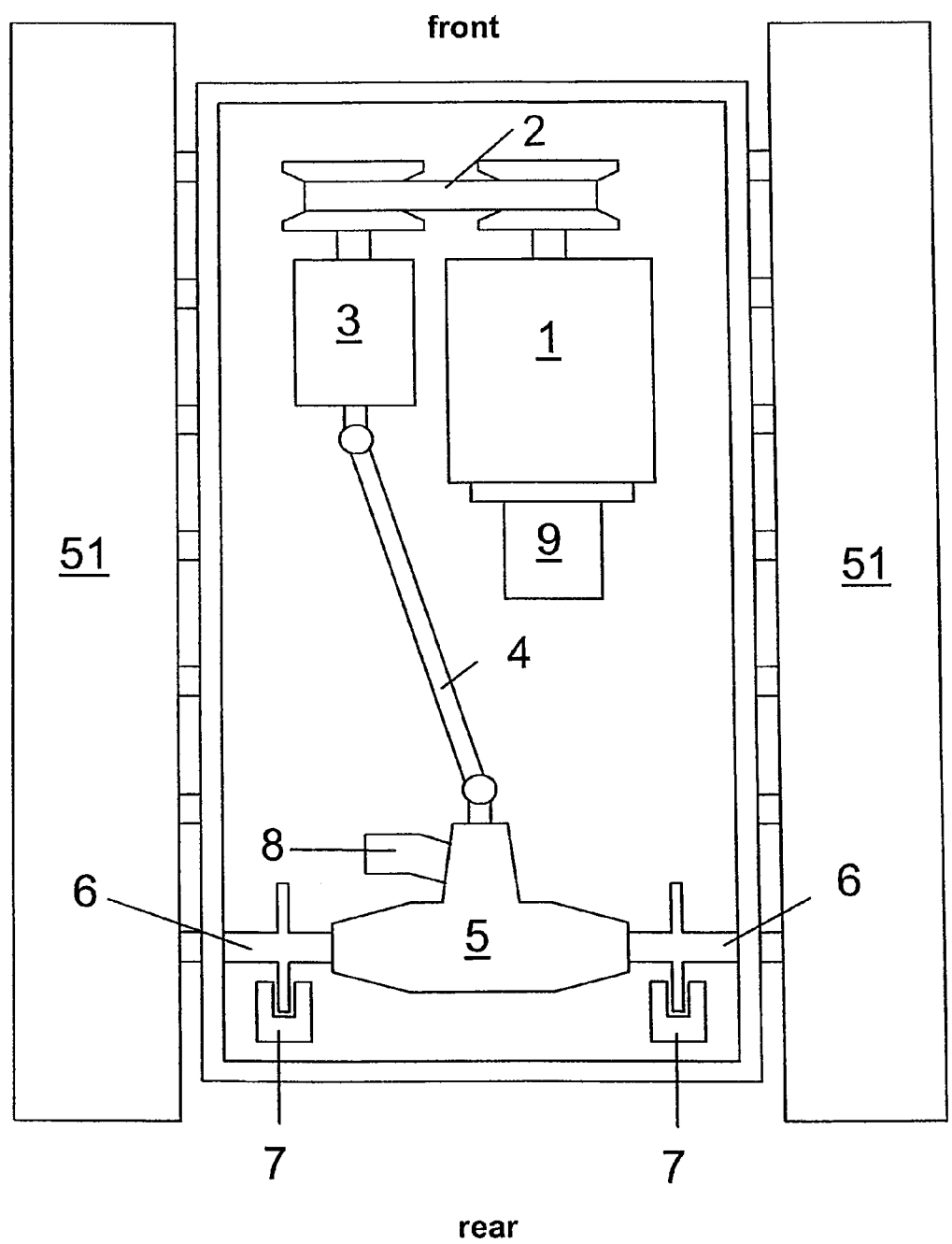
FIG. 3 shows a simplified plan view of the driving components of a vehicle according to the invention.

FIG. 3 shows a simplified plan view of a vehicle according to the invention, wherein an engine 1, which is an internal combustion gasoline engine in this case, delivers the power through a variable transmission 2 and a switching gearbox 3 for selection of the position, i.e., fast forward, low gear, neutral, reverse and parking. The engine could also be a diesel or any other kind of power plant. This present gearbox assembly is a manually shifted gearbox, which can also be an automatic gearbox, or any other kind of clutch and transmission, including hydrostatic drive. The switching gearbox 3 is linked to a drive shaft 4, which brings the power to the differential gearbox 5 in the back of the vehicle. The output of the differential gearbox 5 is connected with final drive shafts 6 and brakes 7 on both sides to deliver the power to tracks 51 on each side of the vehicle. The engine also drives a hydraulic pump 9 which feeds a hydraulic steering motor 8 in case of a steering input of the driver according to the functional description in FIG. 5. This present layout of the components is an example of how the system according to U.S. Pat. No. 7,131,507 B2, with the same inventors as this application, can be executed. In this context, the exact layout is not important. For example, the engine and also the steering gearbox could be arranged differently, resulting in the same functionality of the system.

Figure 4:
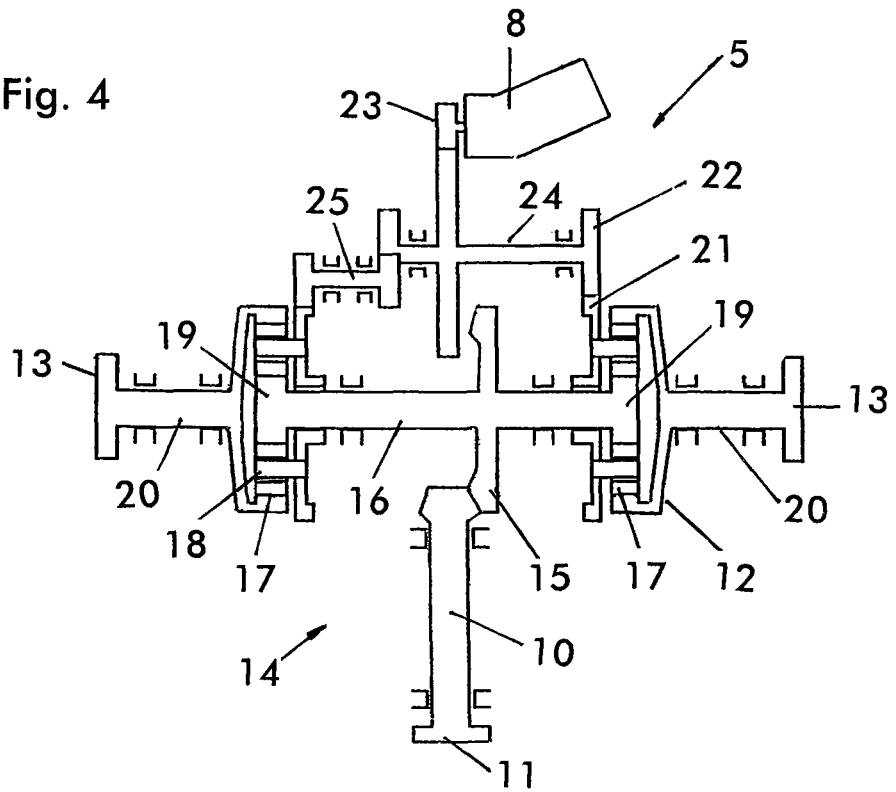
FIG. 4 shows schematically a differential steering device according to the invention.

FIG. 4 shows schematically a differential steering device according to the invention, wherein the power from the engine goes to a coupler 11 and an input shaft 10 and then to the angle gear and a gear reduction unit 15. The driven gear reduction unit 15 is rigidly connected to the differential gear input shaft 16 on both sides and thus delivers the power to the input sun gear 19 of the differential gearbox 14. The differential gears can be executed as planetary gear sets, angle gear sets or any other kind of gearbox layouts. The input in this case is effected on the sun gear 19 of the planetary gear set, but could also be effected on either the planetary gear or the ring gear in any configuration of input/output having a gear ratio adapted depending on the system.

In the present layout, the power output is directed from the ring gear 12 over the output shaft 20 and the connection flange 13. The steering input, on the other hand, is directed from the hydraulic steering motor 8 through the gears and shafts 23, 24 (also referred to as zero shaft), 25, 22, to the planetary gear support 21 and its planetary gears. While driving the vehicle straight in either the forward or the reverse direction, without any steering input, all these components are standing still. This results in a fixed ratio of the differential gears with the same output speed on both sides. Both tracks 51 are therefore rigidly connected for maximum traction.

When a steering input is applied from the driver, the differential gears are driven by the steering system as is for example described in detail in FIG. 5 below. Depending on the amount of steering, the hydraulic motor 8 drives faster or slower in the one or the other direction with respect to the requested turning direction, and drives the planetary gear supports 21 through the gears and shafts 23, 24, 22, 25. On each side, the planetary gear support 21 moves planetary gears 17 through shaft 18 so as to change the ratio of the planetary gear set between the sun gear 19 and the ring gear 12 resulting in the differential speed of the two output shafts 20. To keep a constant velocity of the vehicle, the outer side output shaft 20 and a corresponding drive unit need to run faster than the neutral vehicle speed. The other side output shaft then runs slower for the same value. This is achieved by inverting the rotational direction of the planetary gear support of the one side by an intermediate shaft 25 to change the ratio of the planetary gear set either into positive or negative.

Within this system, the drive of the hydraulic steering motor 8 results in two opposite rotating planetary supports and therefore in lower and correspondingly higher drive ratios of output shafts 20 and final drives 13 with respect to the rotating speed of the input shaft 10. A big advantage of this system also results from the fact, that the steering drive input r.p.m. range of the planetary support 21 gets overlaid by the vehicle drive r.p.m. range of the differential gear input shaft 16, which results in a differential speed of the final drives 13 depending on the vehicle speed. As a result, the turning radius gets wider with increasing vehicle speed at the same steering input from the handlebar 52. This inverse steering behavior is most advantageous and allows the control of the vehicle safely at high vehicle speeds, but also allows for the best maneuverability at low vehicle speeds.

Another big advantage of this system is, that both final drives 13 are always linked together over this variable ratio, assuring that the vehicle moves safely and smoothly in any kind of conditions of the driving surface and driving resistances, regardless of the amount of torque applied from the driver.

It follows that the input drive shaft 10 is rigidly connected through the shaft 16 to the two differential gears, of any kind, one on each side. The outputs of these differential gears are rigidly connected on each side to the corresponding drive shaft 6 of the wheels or tracks.

If the vehicle drives straight without any steering input, the additional hydraulic steering motor 8, axle and gears 2, 4 are stopped and both driven wheels and tracks are therefore fixedly connected with each other and with the drive shafts 6. In this case, the drive train is purely mechanical without any additional losses.

If a steering input is applied to motor 8, the motor starts to turn in the direction corresponding to the steering input, i.e., left or right. The r.p.m. range of this motor depends on the steering angle of the steering input.

On the action of the shaft and gears 2, the differential gears start to turn, which results in a differential speed of the output shafts 20 on both sides. A belt drive may be used in place of the shaft and gears 2. Due to the fact that one wheel or track needs to turn faster than the other, (or as in a standing still case, when turning in place) one shaft 20 drives forward and the other drives backwards. The steering drive train then needs the axle and gears 4 to change the rotating direction of one drive side of the differential gearbox.

Figure 5:
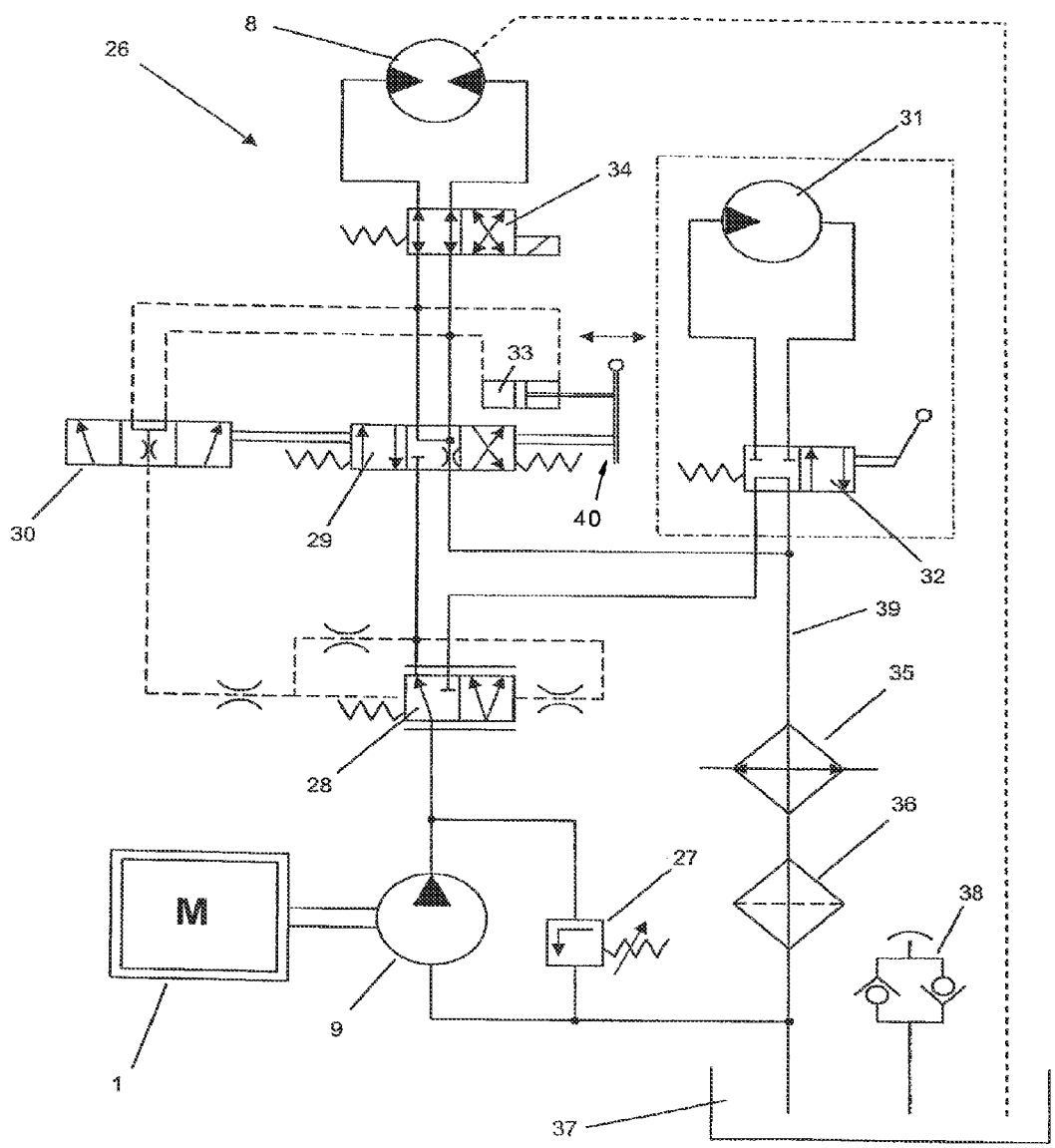
FIG. 5 shows a hydraulic steering unit according to the invention.

FIG. 5 shows a steering hydraulic system according to the invention, wherein the combustion engine 1 drives a hydraulic pump 9 through a side drive to produce a hydraulic pressure needed for the steering function. In the present case, the combustion engine 1 also drives the vehicle, which, however, is not important for the functionality of the system. The hydraulic pump 9 also could be driven by a separate electric motor, for example. Valve 27 controls the operating pressure and limits the maximum system pressure for safety.

A priority flow control valve 28 controls the flow volume to the steering valve 29 in such a way that the pressure drop over the steering valve is used to control pressure difference. The priority control valve 28 works in this layout as a pressure balance and fulfills the function of a 3-way flow control valve. It, therefore, increases or decreases the volume to the steering valve 29 to ensure that the control pressure difference remains constant all the time. The control pressure difference is switched with a valve 30 to one or the other flow direction in the hydraulic circuit. In the present system, this valve 30 is integrated in the steering valve 29.

The steering valve 29 acts, on one hand, like an adjustable orifice. On the other hand, it controls the flow direction over the hydraulic steering motor 8 to achieve the forward or reverse rotation depending on the steering input of the driver to turn the vehicle to one or the other side.

With this configuration, the result lies in a constant relationship of the volume flow and open cross sectional area and therefore in a related r.p.m. range of the hydraulic steering motor 8, independent of the current system pressure and flow volume delivered from the hydraulic pump 9.

The amount of oil which is not used for the steering to achieve the drivers driver's steering input can be either used to drive any working hydraulic unit 31 or will be returned over a return line 39 with heat exchanger 35 and filter 36 back into the oil tank 37. The oil tank is vented through a cap 38 to prevent under/over pressure in the tank.

The steering remains working constantly, independently of the pressure used for the working hydraulic unit which is controlled over the flow control valve 32 and the system pressure control valve 27. If there is not enough volume flow available depending on the operating r.p.m. range of the combustion engine 1 and the pump 9 to fulfill the needs of the steering requests, the steering always has priority because of the function of the priority valve 28. In such a case, the working hydraulic unit 31 just gets the oil which is not needed for the steering function.

To obtain a steering force feedback to the driver through the handlebar or any other steering device 40, an optional hydraulic cylinder 33 can be added into the feed lines of the hydraulic steering motor 8. This feedback force is related to the pressure needed in the steering system and therefore is an indicator for the traction of the two tracks or wheels of the vehicle.

The 4-2 valve 34 is used to reverse the rotation of the hydraulic steering motor 8 and therefore to keep the steering input direction independent of forward or reverse movement of the vehicle. This valve 34 can be switched electrically, hydraulically or mechanically. It is always in the default position for forward driving due to safety reasons.

Figure 6:
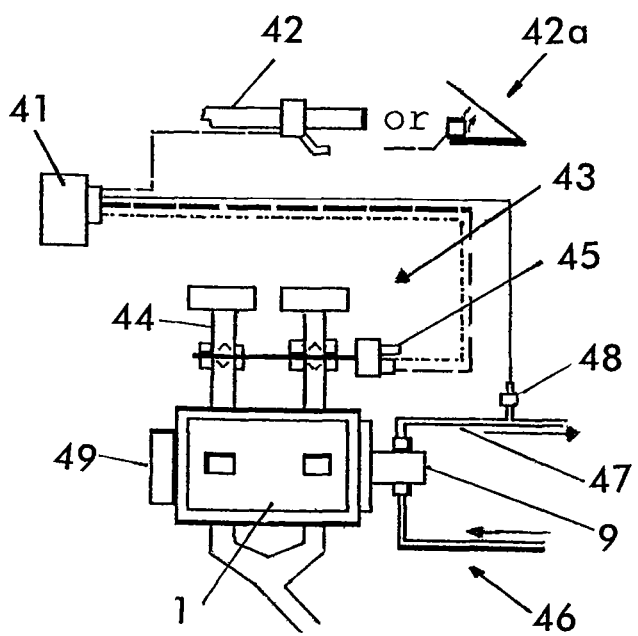
FIG. 6 shows a simplified schematic diagram of an electronic throttle.

FIG. 6 shows a simplified version of an electronic throttle control according to the present invention to control the engine torque and drivability of the vehicle. In the prior art ATVs, the torque of the engine is controlled mechanically via a throttle cable, an input device in a form of a throttle pedal 42A or a thumb throttle lever 42 which opens and closes the throttle body of a combustion engine to control the required torque to drive the vehicle.

An input device in form of a throttle pedal 42A or a thumb throttle lever 42 supplies an electronic signal to the electronic throttle control (ETC) unit 41. This control unit 41 can be integrated in the engine control unit to control the combustion engine fuel, ignition, etc.

Due to the fact that even a skid steered vehicle according to the present invention uses some power increase for steering the vehicle, the engine needs to deliver some more torque to warrant a stable driving without any corrections made by the driver of the vehicle to allow safe driving.

According to the present invention, the steering is initiated by a hydraulic system, which controls the differential speed of the tracks or wheels to let the vehicle steer in a direction. As explained, in the hydraulic system, the combustion engine 1 with its power take off 49 drives a hydraulic pump 9 where the hydraulic oil is supplied to the pump via the feed line 46 and from there via the pressure line 47 to the pressure sensor 48. The priority valve 28 defines the pressure of the hydraulic system needed to generate the required differential speed driven by the hydraulic steering motor 8, as seen in FIG. 5.

The needed torque for steering mainly depends on the conditions of the surface on which the vehicle is driving. On hard surfaces like tar or concrete, more torque and therefore a higher hydraulic pressure is needed to let the vehicle skid steer as requested from the driver. On soft surfaces like mud, sand or snow, less torque is needed to reach the same steering amount and radius of the vehicle. But also the drive train ratio, set by the transmission is influencing the system in the same way. Choosing a low ratio in low gear needs less torque from the engine than using a high ratio in high gear to drive the vehicle.

To compensate for this torque transmitted by the engine and to allow automated stable vehicle driving, the pressure sensor 48 measures the hydraulic pressure generated and reports this value to the ETC control unit 41. The ETC has integrated models and maps to calculate the desired throttle opening compensation and supplies this information to the throttle actuator 45. This throttle actuator changes the throttle body 43 opening over an axle 44 to open one or more throttles. Depending on the application, this can be one or more throttles for all cylinders or individual throttles for each cylinder. The present application shows individual throttles per cylinder, synchronized according to the amount of the needed torque, reflected in more throttles being opened.

The amount of this compensation is calculated from the pressure input value of the pressure sensor 48 as a base function depending on the vehicle speed. To adapt to the various possible situations, additional compensation functions are needed for a stable function of the system. In the present invention, vehicle speed, engine r.p.m. range, engine load, gear position and hydraulic oil temperature are used to calculate the final correction percentage of the throttle opening and engine torque, based on three-dimensional map tables or two-dimensional tables, which also can be calculated model functions as often used in today's automotive applications of similar systems of electronic throttle control systems.

In addition to the main function of the ETC system in skid steered vehicles—compensating for steering losses—other functions such as optimized drivability, learner mode with reduced engine power and limited vehicle speed, smooth and safe vehicle speed limiting depending on the gear chosen, remote control while unmanned driving is occurring or engine power control to work with additional hydraulic equipment 31 (see FIG. 5) can be realized safely without any additional electronic equipment.

The invention claimed is:

1. A skid steered light all terrain vehicle (LATV), comprising:
    a plurality of wheels or tracks located at each side of the vehicle;
    an engine;
    two driving units connected to and driven by the engine, each driving unit being operable to drive the wheels or tracks on one side of the vehicle;
    a driver throttle lever or pedal;
    a steering drive including a hydraulic pump, a hydraulic steering motor, a hydraulic circuit connecting the hydraulic steering motor and the hydraulic pump, and a priority valve, the priority valve being configured to mechanically control a flow volume to control a steering pressure value of the hydraulic circuit needed to generate a required differential speed of the wheels or tracks driven by the hydraulic steering motor;
    a steering pressure sensor operable to detect the steering pressure value;
    an engine torque controlling device with an electronic throttle control system connected to the engine and to the driver throttle lever or pedal, the electronic throttle control system compensating for a torque needed for steering efforts in accordance with the detected steering pressure value so as to control an electronic throttle and to compensate for an engine torque, wherein by compensating for the torque needed for steering efforts the electronic throttle control system is operable to ensure that the engine keeps a vehicle driving speed substantially constant during steering without an input to the driver throttle lever or pedal.

2. The LATV of claim 1, wherein the electronic throttle control system is operable to control a maximum vehicle speed differently depending on a gear engaged without limiting an engine speed range.

3. The LATV of claim 1, wherein the electronic throttle control system is operable to provide a learner mode where a vehicle speed can be adjusted depending on rider skills.

4. The LATV of claim 1, comprising a dry weight of less than one ton, a length of less than 3.5 m and a width of less than 1.65 m.

5. A LATV according to claim 1, further comprising a differential steering device, wherein the differential steering device, the hydraulic steering drive and the engine torque controlling device enable the LATV to turn on a spot and to drive along very tight curves.

6. The LATV of claim 1, further comprising
    a gearbox longitudinally mounted side by side with the engine in a front section of the vehicle; and
    a continuous variable transmission mounted in front of the engine and the gearbox.

7. The LATV of claim 1, further comprising a hydraulic valve operable to change a direction of a hydraulic oil flow of the hydraulic circuit depending if a forward or reverse gear is engaged.

8. The LATV of claim 1, wherein the hydraulic pump is mounted on a housing of the engine and is directly driven from a crankshaft of the engine.

9. The LATV of claim 1, wherein the hydraulic circuit further comprises an auxiliary working hydraulic system, and the steering drive is configured such that the hydraulic steering motor always has priority over the auxiliary working hydraulic system.

10. A skid steered all terrain vehicle (ATV), comprising:
    a plurality of tracks located at each side of the vehicle;
    an engine;
    two driving units connected to and driven by the engine, each driving unit being operable to drive the tracks on one side of the vehicle;
    a driver throttle lever or pedal;
    a differential gearbox configured to produce a differential speed of the two driving units related to a steering angle of a steering input to the differential gearbox regardless of a surface condition on which the vehicle is driven;

a steering drive configured to act on the differential gearbox, the steering drive including a hydraulic pump, a hydraulic steering motor, a hydraulic circuit connecting the hydraulic steering motor and the hydraulic pump, a steering valve connected to the hydraulic steering motor, and a priority valve, the priority valve being configured to mechanically control a flow volume to control a steering pressure value of the hydraulic circuit needed to generate a required differential speed of the tracks, the priority valve controlling the flow volume to cause a pressure difference across the steering valve to remain constant;

a steering pressure sensor operable to detect the steering pressure value; and an engine torque controlling device with an electronic throttle control system connected to the engine and to the driver throttle lever or pedal, the electronic throttle control system compensating for a torque needed for steering efforts in accordance with the detected steering pressure value so as to control an electronic throttle and to compensate for an engine torque, wherein by compensating for the torque needed for steering efforts the electronic throttle control system is operable to ensure that the engine keeps a vehicle driving speed substantially constant during steering without an input to the driver throttle lever or pedal.

11. The ATV of claim 10, wherein each of the two driving units includes a drive axle and the differential gearbox is mounted in a rear section of the vehicle and is aligned with the drive axles of the two driving units.

12. The ATV of claim 10, wherein the differential gearbox comprises a gear train including a zero shaft;

two gear supports connected to the zero shaft;

two planetary gears, each of the planetary gears cooperating with one gear support;

two sun gears; and two ring gears, each ring gear being connected to one of the sun gears and to a connection flange of one of the drive units, each connected pair of one sun gear and one ring gear having a ratio and each of the planetary gears being movable into connection with a respective connected pair of one sun gear and one ring gear so as to change the ratio, wherein steering torque corresponding to the steering input is directed from the hydraulic steering motor through the zero shaft.

* * * * *